United States Patent [19]

Koyama et al.

[11] Patent Number: 5,392,069
[45] Date of Patent: Feb. 21, 1995

[54] IMAGE PROCESSING APPARATUS WHICH CAN PROCESS A PLURALITY OF KINDS OF IMAGES HAVING DIFFERENT ASPECT RATIOS

[75] Inventors: Shinichi Koyama, Tokyo; Hiroyuki Takimoto; Taizou Hori, both of Yokohama; Takashi Kobayashi, Mitaka; Hiroyuki Fukuoka, Hiratsuka; Yoshihiro Nakatani, Yokohama; Jun Makino, Kunitachi, all of Japan

[73] Assignee: Canon Kabushiki Kaisha, Tokyo, Japan

[21] Appl. No.: 73,356

[22] Filed: Jun. 7, 1993

[30] Foreign Application Priority Data

Jun. 11, 1992 [JP] Japan .................. 4-152236
Jun. 16, 1992 [JP] Japan .................. 4-156784
Jun. 24, 1992 [JP] Japan .................. 4-166148

[51] Int. Cl.⁶ ............... H04N 5/278; H04N 5/262; H04N 5/272
[52] U.S. Cl. ................. 348/239; 348/586; 348/589; 358/335
[58] Field of Search ........... 358/183, 209, 180, 185, 358/310, 335; H04N 5/278, 5/262, 5/445, 5/46, 5/225, 5/272, 5/265, 5/92, 5/79; 348/556, 558, 561, 563, 564, 578, 581, 239, 240, 458, 589, 704, 586

[56] References Cited

U.S. PATENT DOCUMENTS

| | | | |
|---|---|---|---|
| 4,439,783 | 3/1984 | Nishikawa | 358/183 |
| 4,613,906 | 9/1986 | Tanaka | 358/183 |
| 4,750,212 | 6/1988 | Yokomizo | 358/183 |
| 4,999,709 | 3/1991 | Yamazaki | 358/209 |
| 5,126,832 | 6/1992 | Lee | 358/183 |
| 5,161,236 | 11/1992 | Nakayama | 358/183 |
| 5,170,253 | 12/1992 | Horiuchi | 358/183 |
| 5,170,256 | 12/1992 | Tabata | 348/564 |
| 5,298,995 | 3/1994 | Monta et al. | 348/458 |

FOREIGN PATENT DOCUMENTS

| | | | |
|---|---|---|---|
| 411440 | 2/1991 | European Pat. Off. | H04N 5/335 |
| 450602 | 10/1991 | European Pat. Off. | H04N 5/272 |
| 487092 | 5/1992 | European Pat. Off. | H04N 9/79 |
| 4011472 | 1/1992 | Japan | H04N 5/265 |
| 4188966 | 7/1992 | Japan | H04N 5/272 |
| 4306979 | 10/1992 | Japan | H04N 5/262 |
| 4321387 | 11/1992 | Japan | H04N 5/278 |
| 4322574 | 11/1992 | Japan | H04N 5/278 |
| 4326261 | 11/1992 | Japan | H04N 5/225 |
| 4347980 | 12/1992 | Japan | H04N 5/278 |

*Primary Examiner*—James J. Groody
*Assistant Examiner*—Chris Grant
*Attorney, Agent, or Firm*—Morgan & Finnegan

[57] ABSTRACT

There is provided an image processing apparatus having an input unit for inputting a video signal, a detection unit for detecting the aspect ratio of the video signal input by the input unit, an image output unit for outputting an image having an aspect ratio corresponding to the aspect ratio detected by the detection unit, and a synthesizing unit for synthesizing the output from the image output unit with the video signal.

34 Claims, 13 Drawing Sheets

| | TITLE IMAGE | CAMERA IMAGE |
|---|---|---|
| (1) | W | W |
| (2) | W | N |
| (3) | N | W |
| (4) | N | N |

W : MOUNT ANAMORPHIC LENS
N : DO NOT MOUNT ANAMORPHIC LENS

FIG. 5C

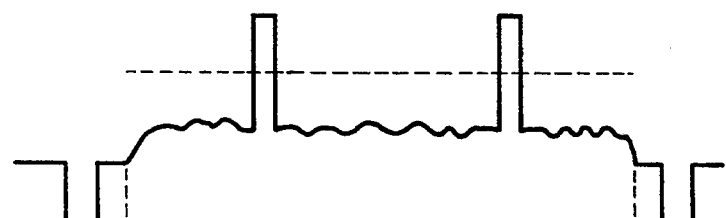
FIG. 6A
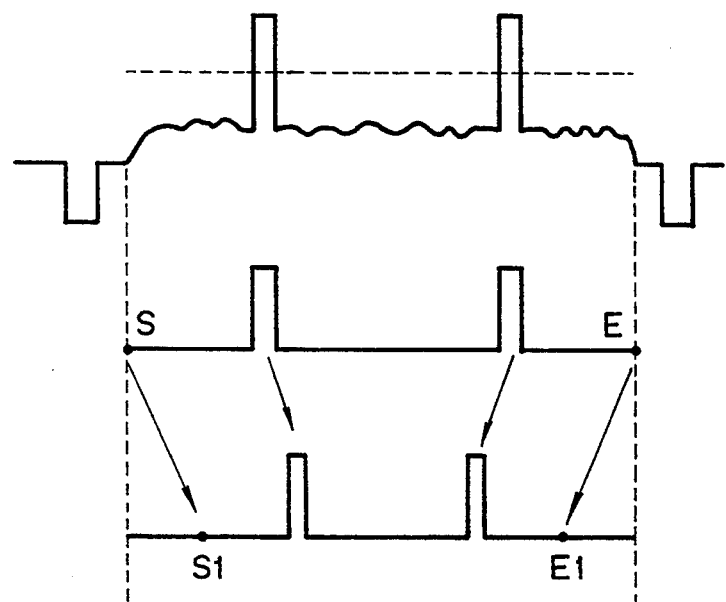
FIG. 6B
FIG. 6C
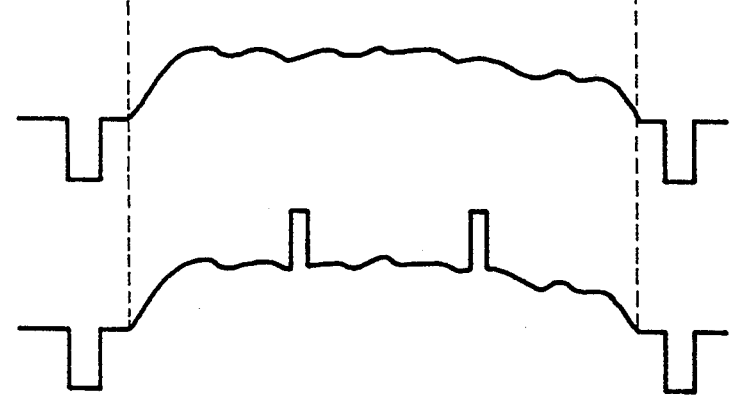
FIG. 6D
FIG. 6E

FIG. 13A
IN CASE OF NORMAL CHARACTER
FIG. 13B
IN CASE OF COMPRESSED CHARACTER
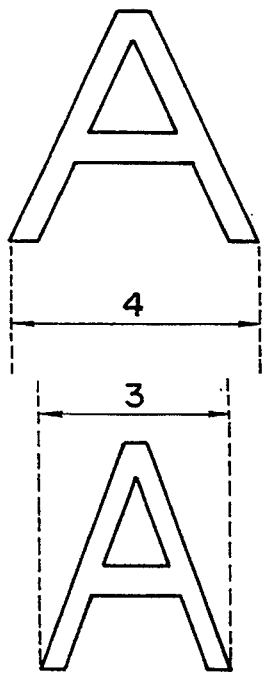
FIG. 14
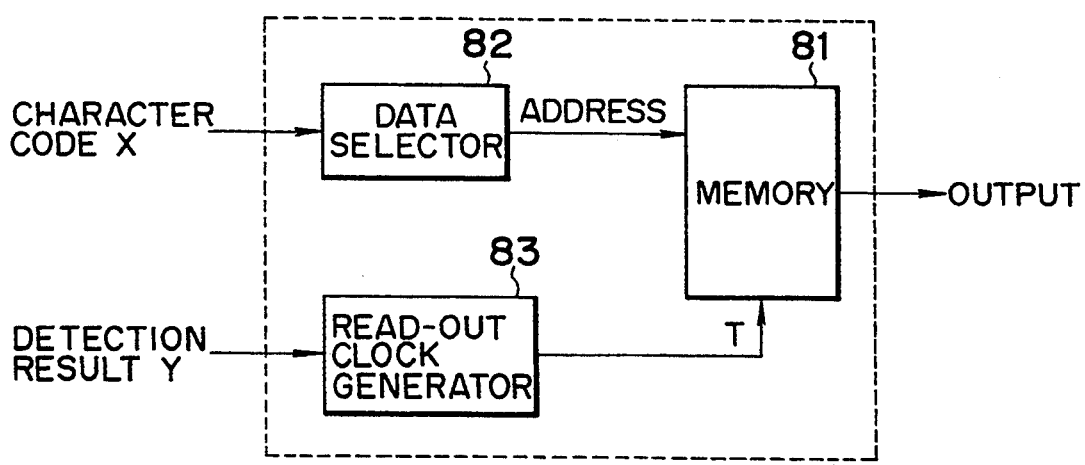

FIG. 15A
FIG. 15B
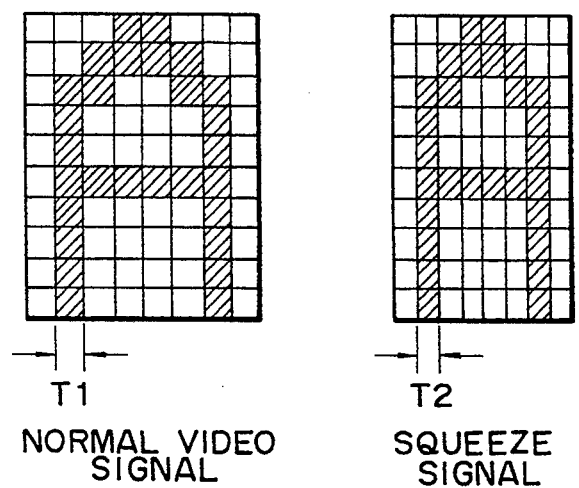
T1
NORMAL VIDEO SIGNAL
T2
SQUEEZE SIGNAL
FIG. 16
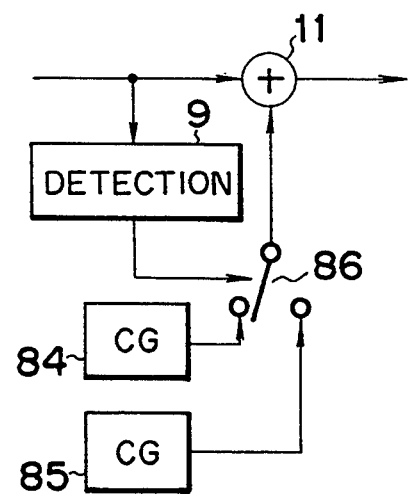

IMAGE PROCESSING APPARATUS WHICH CAN PROCESS A PLURALITY OF KINDS OF IMAGES HAVING DIFFERENT ASPECT RATIOS

BACKGROUND OF THE INVENTION

1. Field of the Invention

The present invention relates to an image processing apparatus and, more particularly, to an image processing apparatus, which can process a plurality of kinds of images having different aspect ratios.

2. Related Background Art

Conventionally, when a video signal is displayed on a monitor screen, the monitor basically has an aspect ratio of 3:4. However, since a test broadcasting program of a hi-vision signal is started, a horizontally elongated monitor (to be referred to as a wide monitor hereinafter) having an aspect ratio of 9:16 is commercially available, and when such a monitor is used together with a MUSE/NTSC decoder, an image can be displayed on a screen having an aspect ratio of 9:16 while complying with the current NTSC system.

In this case, a video signal is a signal including a video data portion which is horizontally compressed (reduced) to ¾ (to be referred to as a squeeze signal hereinafter). When the video signal is displayed on the wide monitor, a normal image can be displayed on the monitor by horizontally expanding the signal to 4/3.

In the field of camera-mounted VTRs as well, an apparatus which optically or electrically compresses an image having an aspect ratio of 9:16 to ¾ in the horizontal direction, and records the compressed image on a tape in accordance with the current television system (e.g., the NTSC system), has already been proposed. With this apparatus, when a reproduced image is displayed on the wide monitor, the picked-up image is expanded to 4/3 in the horizontal direction to normally reproduce an image.

Normally, in a camera-mounted VTR, various kinds of image pickup information (e.g., an image pickup date) are superposed on a picked-up image, and the superposed images are displayed on, e.g., a finder, or are recorded on a recording medium as needed.

Also, the camera-mounted VTR additionally has a function of pre-storing a title to be superposed on a picked-up image in a memory as a still image, superposing the stored title image on the picked-up image, and recording the superposed images on a recording medium.

When a reproduction output of a reproduction head is lower than a predetermined level, i.e., when a reproduction operation is stopped, and when a non-recording portion and a signal-omission portion of a tape are to be reproduced, a blue back signal is generated to cause the monitor to display a blue screen, thereby eliminating discomfort owing to a noisy screen.

If the video camera with the above-mentioned functions can pick up both an image having an aspect ratio of 3:4 and an image having an aspect ratio of 9:16 on the basis of the current television system (e.g., the NTSC system), the following problems are posed.

When an image having an aspect ratio of 9:16 is to be picked up while complying with the current NTSC system, a picked-up image is converted into a squeeze signal, which is optically or electrically compressed in the horizontal direction.

When characters, and the like are to be superposed on the picked-up image, the characters, and the like are superposed on the squeeze signal. However, if the characters are superposed on the squeeze signal in the same manner as an image having an aspect ratio of 3:4, and they are recorded, since a picked-up image is reproduced by expanding the squeeze signal, the superposed characters are elongated in the horizontal direction, and unnatural characters are displayed on the monitor screen.

When a title image fetched at an aspect ratio of 3:4 is reversed, and the reversed image is superposed on a picked-up image having an aspect ratio of 9:16, the width of the title image becomes shorter than that of the picked-up image, and an image-omission portion is formed at one or both of the right and left sides of the title image. Furthermore, the same problem is posed when the above-mentioned blue back screen is displayed.

SUMMARY OF THE INVENTION

The present invention has been made in consideration of the above situation, and has as its object to provide an image processing apparatus for processing images having various aspect ratios, which can properly superpose a signal of, e.g., a title image, a character image, or the like on an input video signal, and can solve the above-mentioned problems.

For this purpose, according to one preferred aspect of the present invention, an image processing apparatus comprises input means for inputting a video signal, detection means for detecting an aspect ratio of the video signal input by the input means, image output means for outputting an image having an aspect ratio corresponding to the aspect ratio detected by the detection means, and addition means for superposing the output from the image output means on the video signal.

Other objects and advantages of the invention will become apparent from the following detailed description taken in conjunction with the appended claims.

BRIEF DESCRIPTION OF THE DRAWINGS

FIGS. 5A to 5E are read timing charts of a memory 32 (FIG. 3) in Case (2) of FIG. 4;

FIGS. 6A to 6E are read timing charts of the memory 32 (FIG. 3) in Case (3) of FIG. 4;

FIGS. 13A and 13B are views for explaining a normal character and a horizontally compressed character;

FIG. 14 is a block diagram showing an internal circuit arrangement of a CG 80 in FIG. 12;

FIGS. 15A and 15B are views showing examples of signals output from the circuit in FIG. 14;

FIG. 16 is a diagram showing another circuit arrangement for selectively outputting a normal character and a horizontally compressed character;

DETAILED DESCRIPTION OF THE PREFERRED EMBODIMENTS

A camera-mounted VTR as an embodiment of an image processing apparatus according to the present invention will be described below with reference to the accompanying drawings.

Figure 1:
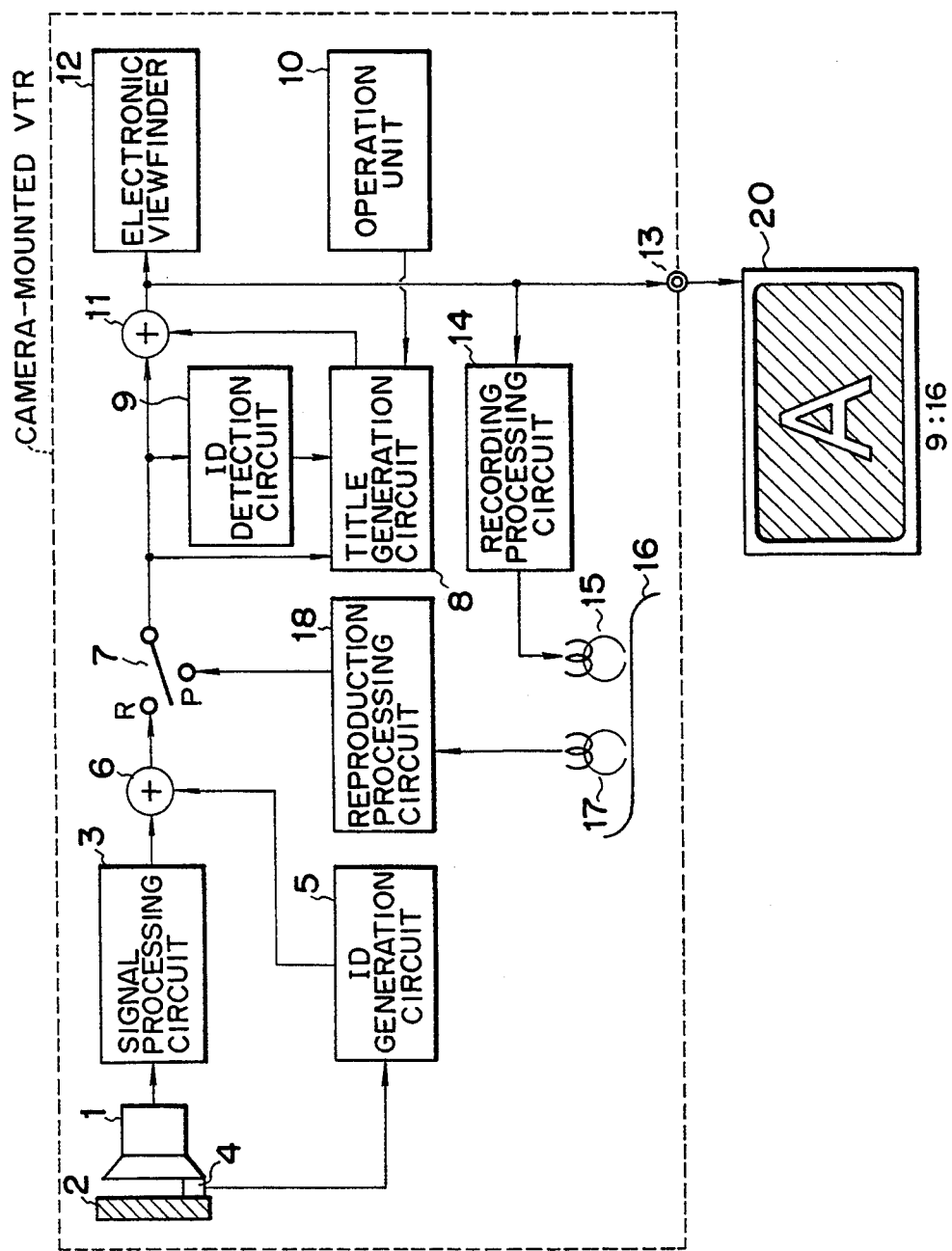
FIG. 1 is a block diagram showing a camera-mounted VTR according to an embodiment of the present invention.

FIG. 1 is a block diagram showing an arrangement of a camera-mounted VTR according to an embodiment of the present invention.

Figure 2:
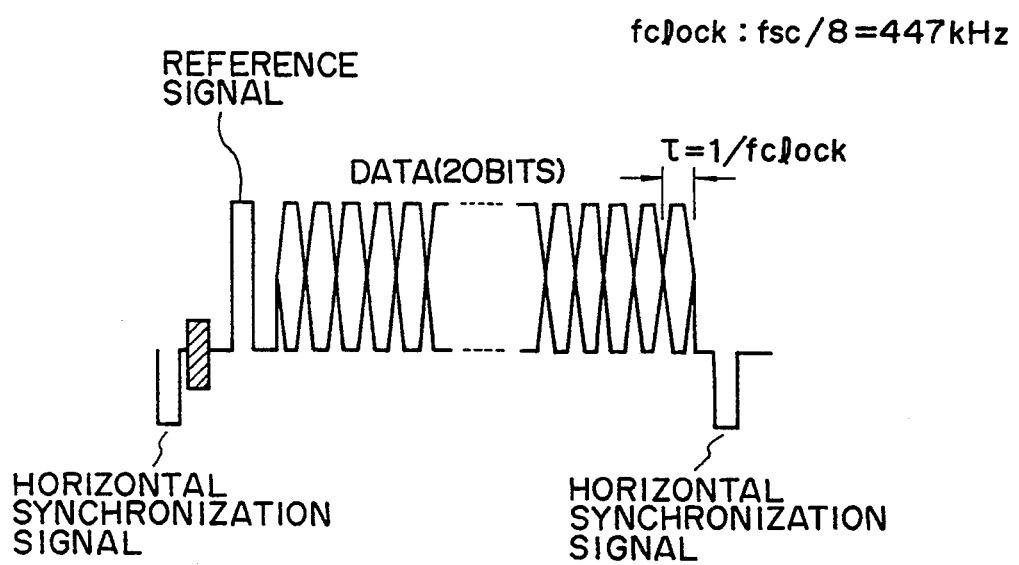
FIG. 2 is a view showing the format of digital data for designating a horizontal compression ratio of a squeeze signal.

The VTR shown in FIG. 1 includes an image pickup system 1 comprising an optical system, and having an image pickup element having an aspect ratio of 3:4, an anamorphic lens 2 detachable from the front surface of the image pickup system 1, a signal processing circuit 3 for executing predetermined camera signal processing for an image signal output from the image pickup system 1, a detector 4 for detecting whether or not the anamorphic lens 2 is mounted on the image pickup system 1, an ID generation circuit 5 for generating digital data shown in FIG. 2 in accordance with the detection result of the detector 4, and an adder 6 for superposing digital data output from the ID generation circuit 5 on a video signal output from the signal processing circuit 3.

The digital data is superposed as follows. That is, when a video signal output form the signal processing circuit 3 complies with the NTSC system, the digital data is superposed on the 20th and 283rd horizontal synchronization signals counted from the vertical synchronization signal of the video signal.

The VTR also includes a selection switch 7 controlled by a control circuit (not shown), and a title generation circuit 8 for generating a title signal.

The VTR further includes an ID detection circuit 9 for detecting whether or not the digital data is superposed on the input video signal, and outputting the detection result to the title generation circuit 8, an operation unit 10 for controlling the title generation circuit 8, an adder 11, an electronic viewfinder 12, an external terminal 13, a recording processing circuit 14, a recording head 15, a magnetic tape 16, a reproduction head 17, and a reproduction processing circuit 18.

A wide monitor 20 having an aspect ratio of 9:16 is connected to the camera-mounted VTR with the above-mentioned arrangement.

The title generation circuit 8 will be described in detail below with reference to FIG. 3.

The title generation circuit 8 includes an A/D converter 31 for converting an analog video signal Vin from the switch 7 into a digital signal, a memory 32 for storing a title image for at least one frame, a memory control circuit 33 for controlling read and write accesses of the memory 32, and a D/A converter 34 for converting a digital video signal from the memory control circuit 33 into an analog signal. An output Vout from the D/A converter 34 is supplied to the adder 11.

The memory control circuit 33 receives a clock signal CLK from a clock generation circuit (not shown), a signal SIZE output from the detection circuit 9, a signal MEMO for commanding to store a picked-up image in the memory 32 as a title image, and a signal DISP for commanding to output a title image stored in the memory 32. The signals MEMO and DISP are generated when a user operates the operation unit 10. The circuit 33 also receives horizontal and vertical synchronization signals Hsync and Vsync generated by synchronization signal generators (not shown). The circuit 33 outputs an address signal ADR for the memory 32, and data DATA to be written in or read out from the memory 32.

The title generation circuit 8 also includes a D-flip-flop 35 for receiving the signal SIZE at its D terminal, and the signal MEMO at its clock terminal T, and supplying its Q output to the memory control circuit 33. As will be described in detail later, the flip-flop 35 stores data indicating whether or not a title image (a video signal picked up as a title) fetched in the memory 32 is picked up with the anamorphic lens 2.

An operation executed when both a title image and a camera image (a video signal not picked up as a title) are picked up with the anamorphic lens (Case (1) in FIG. 4) will be described below. An optical image of an object is reduced to ¾ in the horizontal direction by the anamorphic lens 2, and is converted into an electrical signal by the image pickup system 1. The output from the image pickup system 1 is subjected to known camera signal processing by the signal processing circuit 3. The output from the signal processing circuit 3 is supplied to the adder 6.

When the anamorphic lens 2 is mounted, the detector 4 supplies a signal indicating that the anamorphic lens 2 is mounted to the ID generation circuit 5.

The ID generation circuit 5 generates digital data (ID) shown in FIG. 2, and the digital data is superposed on the video signal from the signal processing circuit 3 by the adder 6.

The ID detection circuit 9 detects the superposed ID, and outputs the control signal SIZE indicating that an image having an aspect ratio of 9:16 is picked up to the title generation circuit 8.

That is, the signal SIZE is at "H" level.

When a user operates a memory button, provided to the operation unit 10, for instructing to fetch a title image, the signal MEMO changes from "L" level to "H" level, and then to "L" level. In response to this change in signal MEMO, the D-flip-flop 35 reads the signal SIZE, and its Q output goes from "L" level to "H" level. At the same time, the A/D converter 31 converts a video signal Vin from the switch 7 into a digital signal, and the memory control circuit 33 writes output data from the A/D converter 31 in the memory 32.

When a user depresses a title display button provided to the operation unit 10, the signal DISP goes from "L" level to "H" level. In response to this, the memory control circuit 33 reads out stored data from the memory 32 at the same speed as the write speed, and outputs the readout data to the D/A converter 34. The D/A converter 34 converts the digital signal from the memory control circuit 33 into an analog signal Vout, and the signal Vout is supplied to the adder 11.

The adder 11 superposes a title image from the title generation circuit 8 on a camera image from the switch 7. At this time, the camera image is the one which is picked up with the anamorphic lens 2, and has the same aspect ratio as that of the title image. For this reason, the superposed title image output from the adder 11 is a natural one.

Figures 3, 4:
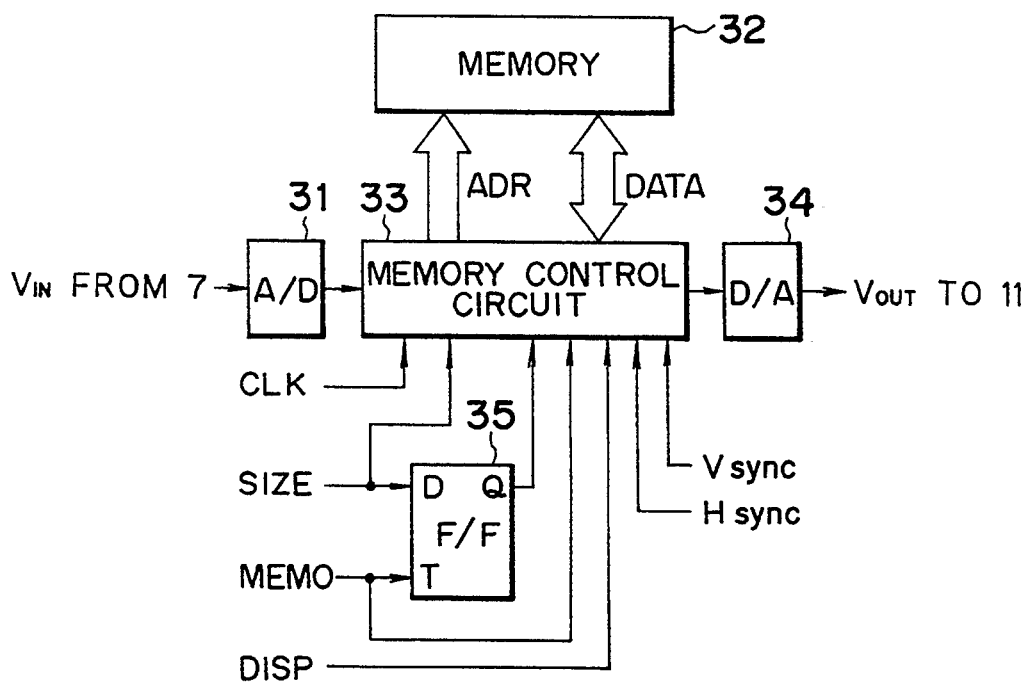
FIG. 3 is a block diagram showing an internal circuit arrangement of a title generation circuit 8 shown in FIG. 1.
FIG. 4 is a table showing combinations of normal and wide aspect ratios for title and camera images.

Assume that a user detaches the anamorphic lens 2 while the title image fetched in the title generation circuit 8 (i.e., the memory 32) with the anamorphic lens 2 is left unchanged (Case (2) in FIG. 4). Then, the signal SIZE goes to "L" level. The Q output from the flip-flop 35 is at "H" level. Thus, the memory control circuit 33 is set in a mode for reading out a central portion, excluding right and left portions, of a title image stored in the memory 32 at a speed $\frac{3}{4}$ the write speed. Since the anamorphic lens 2 is detached, a camera image supplied from the switch 7 to the adder 11 has an aspect ratio of 3:4.

When the user depresses the title display button provided to the operation unit 10, the signal DISP goes from "L" level to "H" level. In response to this, the memory control circuit 33 begins to read out the title image stored in the memory 32. FIGS. 5A to 5E show read timings of the memory 32.

Figure 5A:
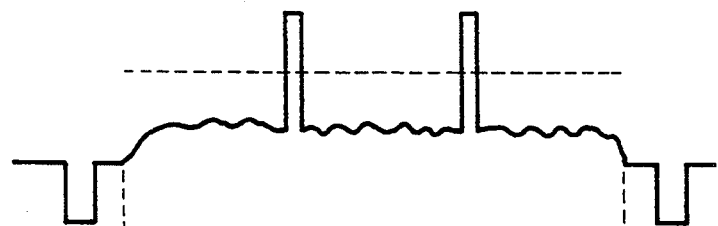
Figure 5B:
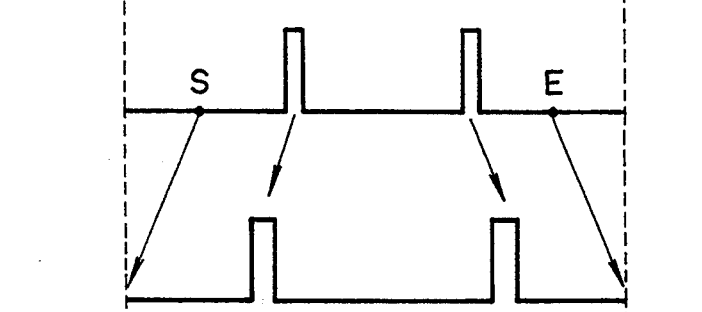

FIG. 5A shows a video signal for one horizontal line obtained upon picking up of a title image. The video signal is binarized in accordance with a threshold value indicated by a broken line, and the binarized signal is stored in the memory 32. FIG. 5B shows the title image for one horizontal line stored in the memory 32. The memory control circuit 33 starts a reading operation from a point S in FIG. 5B, advances read addresses at a speed $\frac{3}{4}$ the write speed, and completes the reading operation at a point E. Thus, a title image optically reduced to $\frac{3}{4}$ in the horizontal direction upon mounting of the anamorphic lens 2 is decoded to a normal figure at the aspect ratio of 3:4. FIG. 5C shows the title image (Vout) for one horizontal line, which is enlarged in the horizontal direction by controlling the addresses of the memory 32.

Figure 5D:
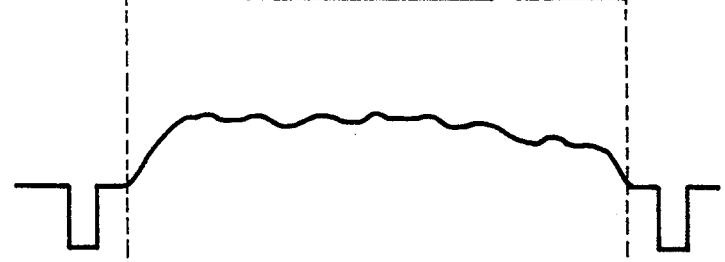
Figure 5E:
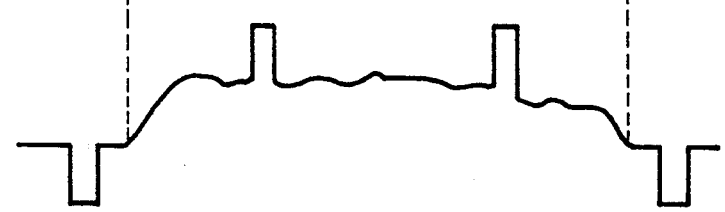

FIG. 5D shows a camera image (aspect ratio of 3:4) for one horizontal line. The title image shown in FIG. 5C is superposed on the camera image shown in FIG. 5D by the adder 11. FIG. 5E shows an output from the adder 11.

An operation executed when both a title image and a camera image are picked up without mounting the anamorphic lens 2 (Case (4) in FIG. 4) will be described below. An optical image of an object is converted into an electrical signal by the image pickup system 1, and the output from the image pickup system 1 is subjected to known camera signal processing by the signal processing circuit 3. The output from the signal processing circuit 3 is supplied to the adder 6. Since the anamorphic lens 2 is not mounted, the ID generation circuit 5 does not generates any ID. Since the ID detection circuit 9 does not detect any ID, it supplies the control signal SIZE indicating that an image having an aspect ratio 3:4 is picked up to the title generation circuit 8. More specifically, the signal SIZE is at "L" level.

When a user operates the memory button, provided to the operation unit 10, for instructing to fetch a title image, the signal MEMO changes from "L" level to "H" level, and then to "L" level. In response to this change in signal MEMO, the D-flip-flop 35 reads the signal SIZE. In this case, since the signal SIZE is at "L" level, the Q output of the flip-flop 35 is at "L" level. In the same manner as described above, a video signal (title image) from the switch 7 is written in the memory 32.

When a user depresses the title display button provided to the operation unit 10, the signal DISP goes from "L" level to "H" level. In response to this signal change, the memory control circuit 33 reads out stored data from the memory 32 at the same speed as the write speed, and outputs the readout data to the D/A converter 34. The D/A converter 34 converts the digital signal from the memory control circuit 33 into an analog signal Vout, and the signal Vout is supplied to the adder 11.

The adder 11 superposes a title image from the title generation circuit 8 on a camera image from the switch 7. At this time, the camera image is the one which is picked up without mounting the anamorphic lens 2, and has the same aspect ratio as that of the title image. For this reason, the superposed title image output from the adder 11 is a natural one.

Assume that the user mounts the anamorphic lens 2 while the title image fetched in the title generation circuit 8 (i.e., the memory 32) without mounting the anamorphic lens 2 is left unchanged (Case (3) in FIG. 4). Thus, the signal SIZE goes to "H" level. The Q output from the flip-flop 35 is at "L" level. The memory control circuit 33 is then set in a mode for reading out the title image stored in the memory 32 while reducing it in the horizontal direction. Since the anamorphic lens 2 is mounted, a camera image supplied from the switch 7 to the adder 11 has an aspect ratio of 9:16. More specifically, the camera image is converted into a so-called squeeze signal.

When a user depresses the title display button provided to the operation unit 10, the signal DISP goes from "L" level to "H" level. In response to this, the memory control circuit 33 begins to read out the title image stored in the memory 32. FIGS. 6A to 6E show the read timings of the memory 32.

FIG. 6A shows a video signal for one horizontal line obtained upon picking up of a title image (aspect ratio of 3:4). The video signal is binarized in accordance with a threshold value indicated by a broken line, and the binarized signal is stored in the memory 32. FIG. 6B shows the title image for one horizontal line stored in the memory 32, and FIG. 6C shows the title image for one horizontal line read out from the memory 32 by the memory control circuit 33. As can be seen from FIGS. 6B and 6C, the memory control circuit 33 starts the reading operation of the title image to be read out of each horizontal line from a timing delayed by a predetermined period (a period corresponding to an interval between S in FIG. 6B to S1 in FIG. 6C), advances read addresses at a speed 4/3 the write speed, and completes the reading operation earlier by a predetermined period (a period corresponding to an interval between E1 in FIG. 6C to E in FIG. 6B). Thus, the title image having the aspect ratio of 3:4 is reduced to $\frac{3}{4}$ in the horizontal direction by controlling the memory addresses, and has an aspect ratio of 9:16.

FIG. 6D shows a camera image (aspect ratio of 9:16) for one horizontal line. The adder 11 superposes the title image shown in FIG. 6C on the camera image shown in FIG. 6D. FIG. 6E shows an output from the adder 11.

The video signal output from the adder 11 is supplied to the electronic viewfinder 12, the recording processing circuit 14, and the external output terminal 13.

A user can watch a picked-up image and a recorded image via the electronic viewfinder 12.

The recording processing circuit 14 executes predetermined processing for recording the video signal on the magnetic tape 16 as a recording medium, and the processed video signal is recorded on the magnetic tape 16 by the recording head 15.

When the wide monitor 20 having the aspect ratio of 9:16 is connected to the external output terminal 13, it performs detection of an ID. If an ID is detected, the monitor 20 displays an image expanded to 4/3 in the horizontal direction on the screen.

An image signal recorded on the magnetic tap 16 is read out by the reproduction head 17, and is subjected to predetermined signal processing by the reproduction processing circuit 18, thus reproducing a video signal.

The video signal from the reproduction processing circuit 18 is supplied to the ID detection circuit 9, the adder 11, and the title generation circuit 8 via the switch 7.

Thus, a title image can be superposed on the reproduced video signal in the same manner as in the recording mode.

Means for storing data indicating whether or not a title image to be stored is picked up using the anamorphic lens 2, i.e., that the aspect ratio is 3:4 or 9:16 is not limited to the flip-flop 35, and various other storage means may be used, as a matter of course.

In the above embodiment, the wide aspect ratio is realized using the anamorphic lens 2. The present invention can be applied to a case wherein an image pickup element which can be used for both the wide and normal aspect ratios is used. In this case, an aspect ratio switching signal of this image pickup element can be used as the signal SIZE in the above embodiment.

Figure 7:
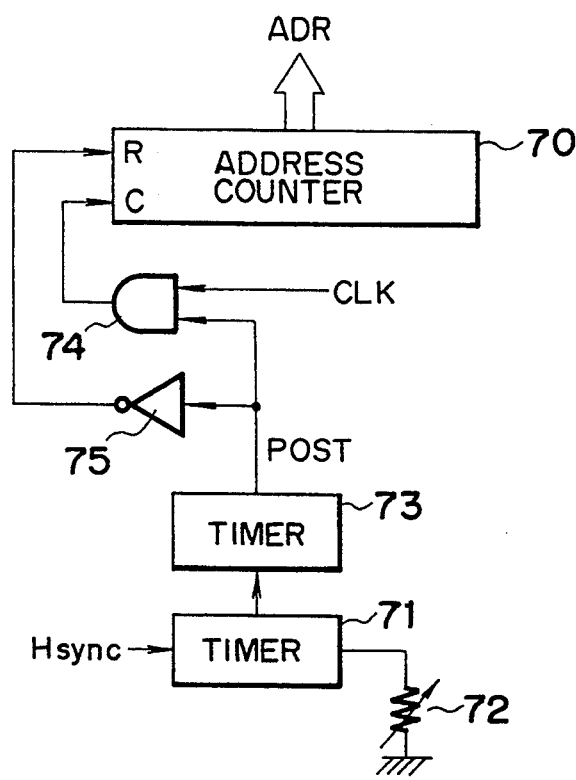
FIG. 7 is a block diagram showing a main circuit portion of an embodiment allowing to change the insertion position of a title image in the horizontal direction in the case of the wide aspect ratio.

A modification of the above embodiment will be described below. In this modification, when a title image fetched at an aspect ratio of 3:4 is superposed on a camera image having an aspect ratio of 9:16, the title image can be re-arranged at an arbitrary position in the horizontal direction. In this modification, the memory control circuit 33 additionally includes means for changing an address generation timing. FIG. 7 is a block diagram showing a main part arrangement of this means, and FIGS. 8A to 8C are timing charts of FIG. 7.

In FIG. 7, an address counter 70 generates read/write addresses of the memory 32, and has a count input terminal C and a reset input terminal R. A timer 71 starts time measurement in accordance with the horizontal synchronization signal Hsync, and a time to be measured by the timer 71 can be desirably changed by a variable resistor 72. A timer 73 measures a predetermined period of time in accordance with the output from the timer 71. An AND gate 74 allows a clock CLK to pass therethrough in response to an output POST from the timer 73. An inverter 75 inverts the signal POST. The output from the AND gate 74 is supplied to the C input terminal of the address counter 70, and the output from the inverter 75 is supplied to the R input terminal of the address counter 70.

Figure 8A:
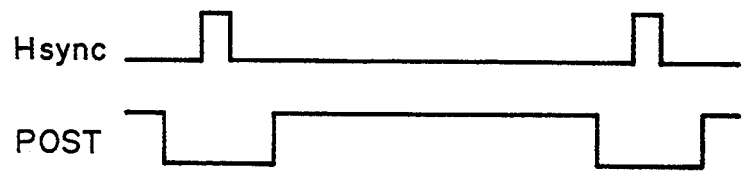
FIGS. 8A to 8C are timing charts of FIG. 7.
Figure 8B:
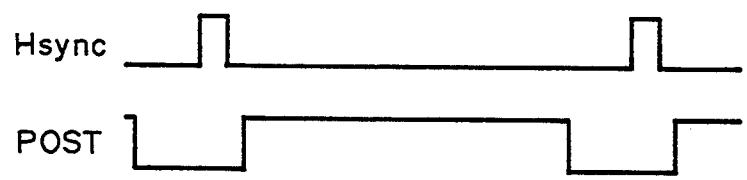
Figure 8C:
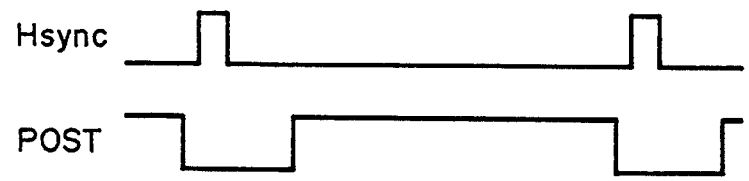
Figure 9:
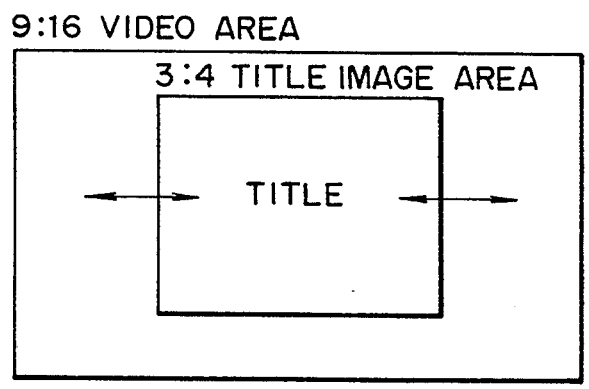
FIG. 9 is a view showing an example of a screen synthesized with a title image.

FIG. 8A shows a case wherein the variable resistor 72 defines a standard measurement time of the timer 71, FIG. 8B shows a case wherein the measurement time is shorter than that in FIG. 8A, and FIG. 8C shows a case wherein the measurement time is longer than that in FIG. 8A. Since the signal POST changes the reset and clock input timings of the address counter 70 with respect to the horizontal synchronization signal Hsync, the insertion position of the title image can be desirably changed in the horizontal direction. More specifically, as shown in FIG. 9, a 3:4 title image can be arranged at an arbitrary horizontal position in a 9:16 video area.

The vertical insertion position of the title image can be similarly changed. Also, read address control of the memory 32 can be achieved by various software and hardware methods.

A title image picked up in the same manner as a camera image has been exemplified. However, the present invention can be applied to a case wherein a character, figure, or image generated by a character generator such as image pickup date information is to be superposed.

As can be easily understood from the above description, according to this embodiment, even when a title image having an aspect ratio different from that of a camera image is fetched, since the title image is superposed on the camera image after its horizontal magnification is changed, a natural title image can be inserted. When the wide aspect ratio is selected, the insertion position of the title image can be desirably changed.

Figure 10:
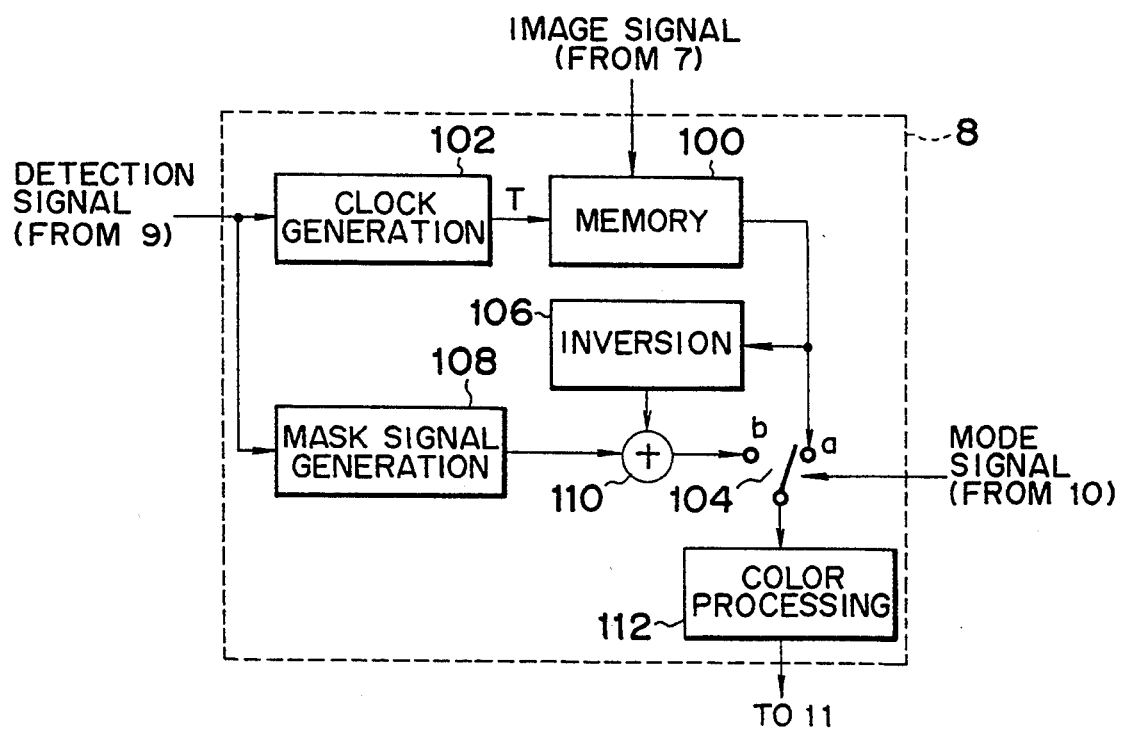
FIG. 10 is a block diagram showing another internal circuit arrangement of the title generation circuit 8 shown in FIG. 1.

FIG. 10 shows a circuit arrangement of the title generation circuit 8 according to another embodiment of the present invention. A memory 100 stores an image signal from the switch 7 for at least one frame, and a clock generation circuit 102 generates a clock having a period T1 or T2 according to the detection signal from the ID detection circuit 9. The memory 100 stores an image signal from the switch 7 or reads out the stored image signal in accordance with the clock from the clock generation circuit 102.

The image signal read out from the memory 100 is supplied to a contact a of a switch 104 and an inversion circuit 106. A mask signal generation circuit 108 outputs a predetermined mask signal when a detection signal from the ID detection circuit 9 indicates a compressed signal. The inversion circuit 106 inverts the image signal read out from the memory 100, and an adder 110 superposes the output from the mask signal generation circuit 108 on the output from the inversion circuit 106. The output from the adder 119 is supplied to a contact b of the switch 104.

The switch 104 is switched in accordance with a mode signal from the operation unit 10. More specifically, the switch 104 selects one of the image signal itself read out from the memory 100 or a signal inverted by the inversion circuit 106 and superposed with the mask signal as needed in accordance with the mode signal. A color processing circuit 112 superposes predetermined color information on the output from the switch 104, and outputs the sum, signal to the adder 11.

Figure 11A:
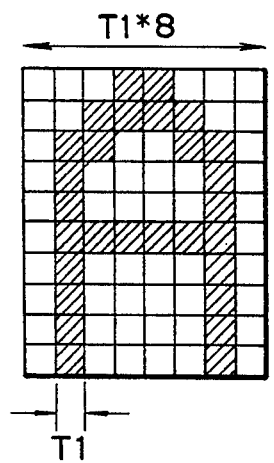
FIGS. 11A and 11B are views for explaining read timings of a title image in the circuit shown in FIG. 10.
Figure 11B:
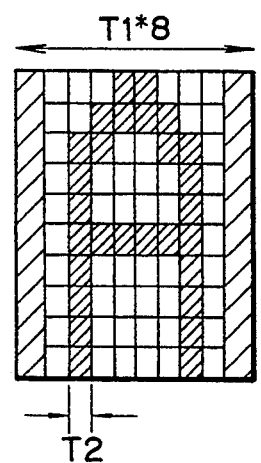

FIGS. 11A and 11B show the relationship between the widths of a normal video signal and a squeeze signal (signal compressed in the horizontal direction). FIG. 11A shows a normal video signal, which is written in the memory 100 in response to the clock having the period T1. FIG. 11B shows a squeeze signal, which is written in the memory 100 in response to the clock having the period T2. Note that $T2=(\frac{3}{4})T1$. In FIGS. 11A and 11B, one square corresponds to one pixel. In order to superpose a title image fetched at the aspect ratio of 3:4 on a video signal having the aspect ratio of 9:16, an image shown in FIG. 11A can be read out at the period T2.

Assume that an image having the aspect ratio of 3:4 is stored as a title image in the memory 100 in accordance with the clock T1, and this title image is to be superposed on a compressed video signal picked up using the anamorphic lens 2, i.e., a squeeze signal. In this case, the operation of the title generation circuit 8 will be described below.

In accordance with the detection output from the ID detection circuit 9, the clock generation circuit 102 generates a read clock having the period T2, and the memory 100 outputs the stored image signal in accordance with the generated clock. The image signal read out from the memory 100 is a squeeze signal compressed to $\frac{3}{4}$ in the horizontal direction. When this signal is to be output without any modifications, the switch 104 is connected to the contact a in accordance with the mode signal from the operation unit 10; when this signal is to be inverted, the switch 104 is connected to the contact b.

When an image signal is to be inverted, the inversion circuit 106 inverts the image signal read out from the memory 100. When the ID detection circuit 9 detects that the picked-up video signal is horizontally compressed, the mask signal generation circuit 108 outputs a mask signal for masking the right and left portions of the screen in accordance with the detection output from the ID detection circuit 9. The adder 110 superposes the mask signal from the mask signal generation circuit 108 on the output from the inversion circuit 106, and supplies the superposed signals to the contact b of the switch 104.

When an inverted title mode is selected, the switch 104 is connected to the contact b, and the output from the adder 110 is supplied to the color processing circuit 112. The color processing circuit 112 superposes predetermined color information on the output from the adder 110, and outputs the sum signal to the adder 11. In the inverted title mode, since the right and left portions of the inverted title image are masked by the mask signal generation circuit 108 and the adder 110, the right and left image portions on the screen will not be omitted even after the inverted title is superposed.

In this embodiment, when a title image fetched at the aspect ratio of 3:4 is inverted, and the inverted title image is superposed on a video signal having the aspect ratio of 9:16, since the right and left portions of the inverted title image are masked by the mask signal generation circuit 108 and the adder 110, the right and left image portions on the screen will not be omitted after the title image is superposed.

Figure 12:
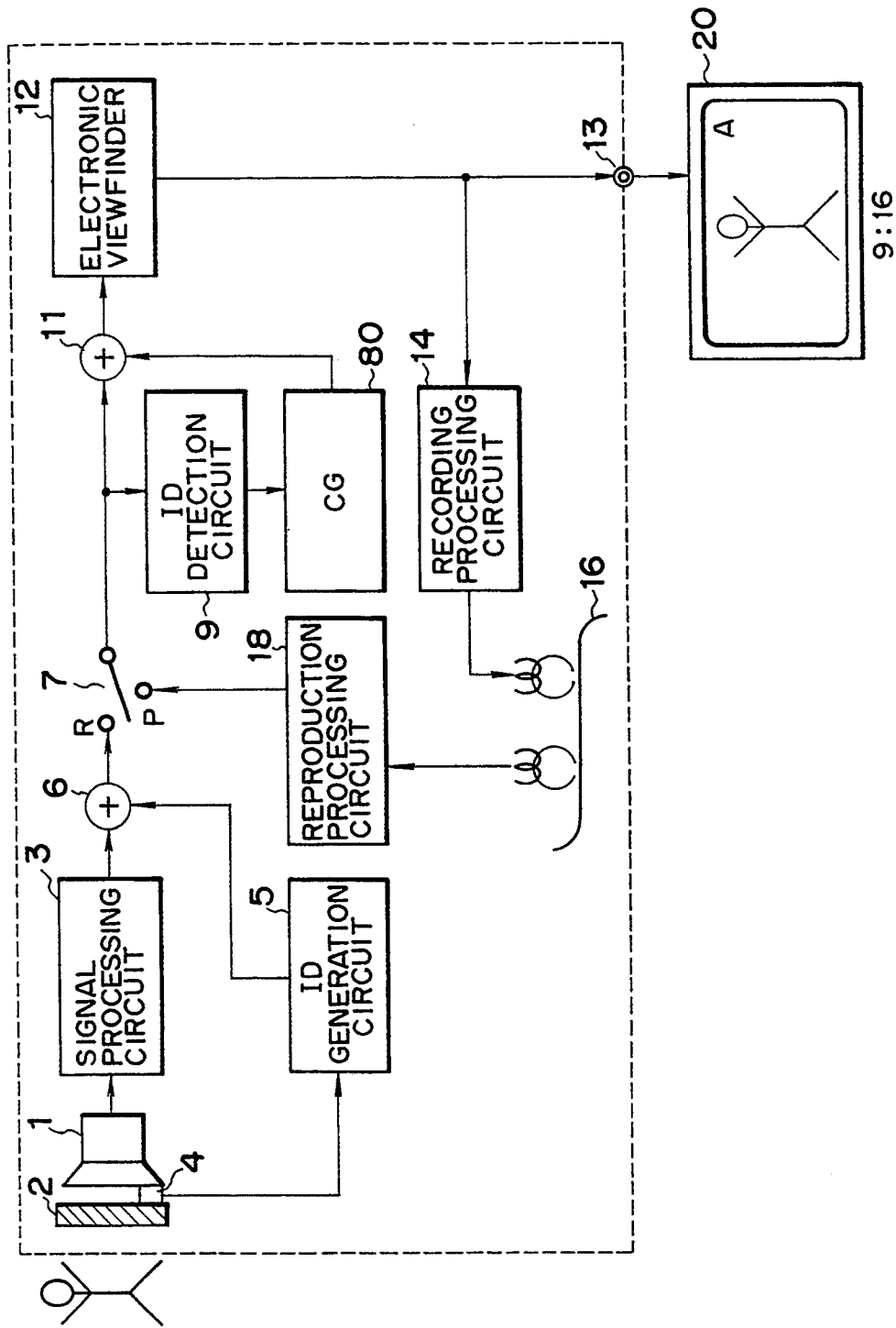
FIG. 12 is a block diagram showing a camera-mounted VTR according to another embodiment of the present invention.

FIG. 12 shows a camera-mounted VTR in which the above-mentioned invention is applied to a character generator (CG).

The same reference numerals in FIG. 12 denote the same parts as in FIG. 1, and a detailed description thereof will be omitted.

The VTR of this embodiment includes a character generator (CG) 80.

When the ID detection circuit 9 detects that a video signal input to the adder 11 is picked up by the image pickup system 1 alone, the CG 80 outputs a normal character image, as shown in FIG. 13A.

On the other hand, when the ID detection circuit 9 detects that a video signal input to the adder 11 is picked up with the anamorphic lens 2, the CG 80 outputs a horizontally compressed character image, as shown in FIG. 13B.

FIG. 14 shows a circuit arrangement of the CG for outputting image signals having different widths on the basis of a single font pattern. In this case, the read clock period is shortened to $\frac{3}{4}$, thereby outputting a character image having a smaller width.

A memory 81 stores font patterns of characters. A data selector 82 converts a character code signal X from a control circuit (not shown) into a corresponding address on the memory 81, and supplies the converted address to the memory 81. A read-out clock generation circuit 83 generates read-out clocks having different periods in accordance with a detection result Y from the detection circuit 9. More specifically, when a squeeze signal is input, the generation circuit 83 generates a read-out clock having a period $\frac{3}{4}$ that generated when a non-squeeze signal is input. This read-out clock is supplied to the memory 81, and dot data of each font is read out in accordance with the supplied read-out clock.

FIGS. 15A and 15B show examples of font pattern data to be read out. FIG. 15A shows a font pattern to be read out when a normal video signal is input, and FIG. 15B shows a font pattern to be read out when a squeeze signal is input. When the read-out clock period for the normal video signal is represented by T1, a read-out clock period T2 for the squeeze signal is $\frac{3}{4}$ of T1. Thus, in the case of the squeeze signal, a character image the width of which is compressed to $\frac{3}{4}$ as compared to a normal image is generated.

As shown in FIG. 16, a CG 84 for storing font pattern data for a normal video signal, and a CG 85 for storing font pattern data, whose widths are compressed to $\frac{3}{4}$, for a squeeze signal are arranged, and the output from the CG 84 or 85 may be selectively supplied to the adder 11 by a switch 86, which is switched according to the detection result of the detection circuit 9.

Figure 17:
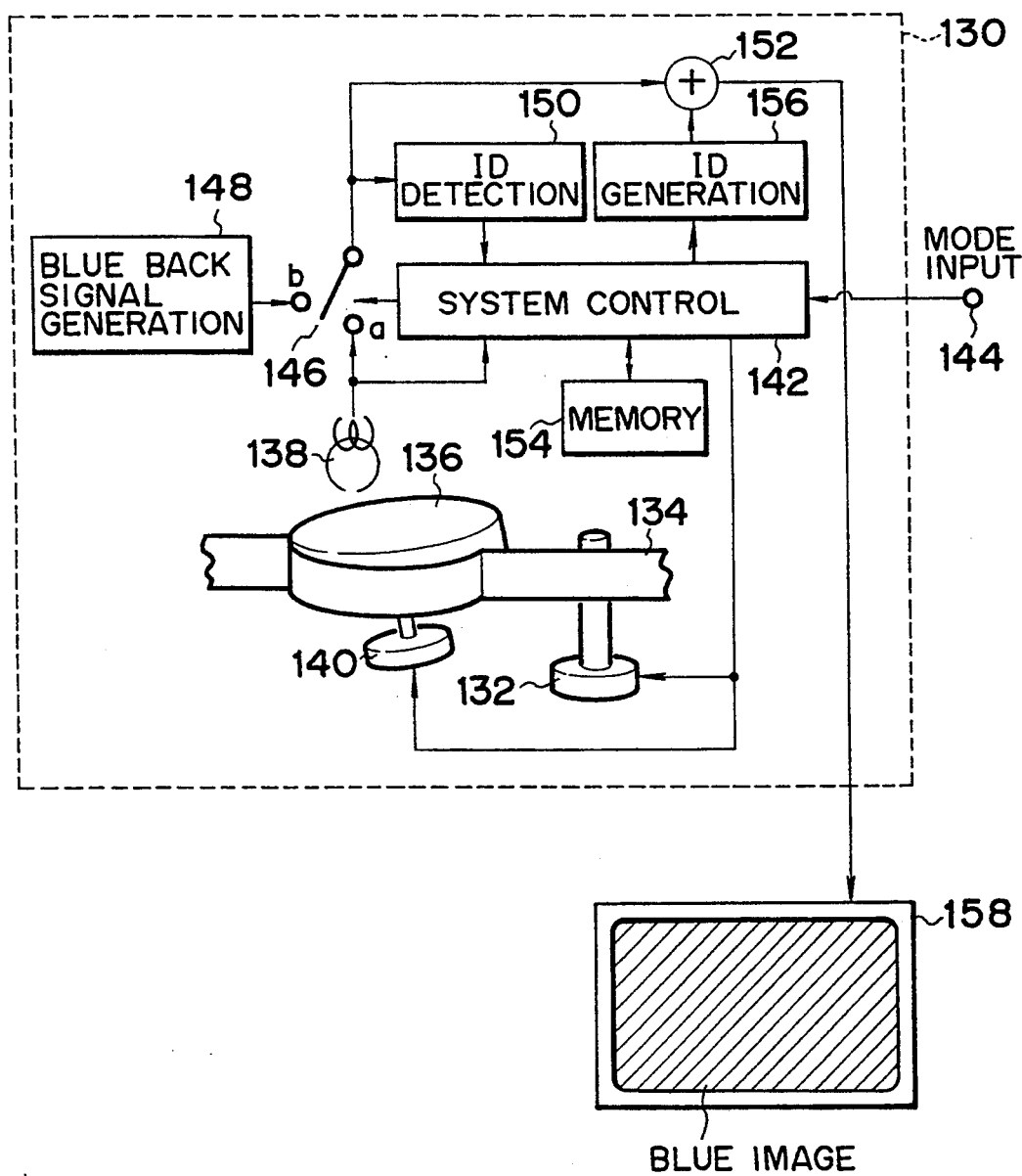
FIG. 17 is a block diagram showing a reproduction apparatus according to still another embodiment of the present invention.

An embodiment wherein the present invention is applied to generation of a blue back signal of a reproduction apparatus will be described below. FIG. 17 is a block diagram showing a schematic arrangement of a reproduction apparatus according to an embodiment of the present invention. In a reproduction apparatus 130 of this embodiment, a capstan motor 132 is used for conveying a magnetic tape 134, and a reproduction head 138 is attached to a rotary drum 136 inclined with respect to the magnetic tape 134. A motor 140 rotates the rotary drum 136. A system control circuit 142 controls the motors 132 and 140 in accordance with a mode signal from a mode input terminal 144.

The output from the reproduction head 138 is supplied to a switch 146 and the system control circuit 142. A blue back generation circuit 148 generates a blue back signal including a synchronization signal like the blue back generation circuit 48. The switch 146 is controlled by the system control circuit 142. In a reproduction mode, the switch 146 selects the output from the reproduction head 138 (contact a), and when a reproduction operation is stopped, and the output from the reproduction head 138 is omitted, the switch 146 selects the output from the blue back generation circuit 148 (contact b).

The signal selected by the switch 146 is supplied to an ID detection circuit 150 and an adder 152. The ID detection circuit 150 detects the presence/absence of an ID signal shown in FIG. 2, and outputs the detection result to the system control circuit 142. The system control circuit 142 stores the detection result of the ID detection circuit 150 in a memory 154. An ID generation circuit 156 generates a signal shown in FIG. 2 at a predetermined timing in accordance with a command from the system control circuit 142. The output from the ID generation circuit 156 is supplied to the adder 152. The output from the adder 152 is connected to a monitor, e.g., a wide monitor 158.

Figure 18:
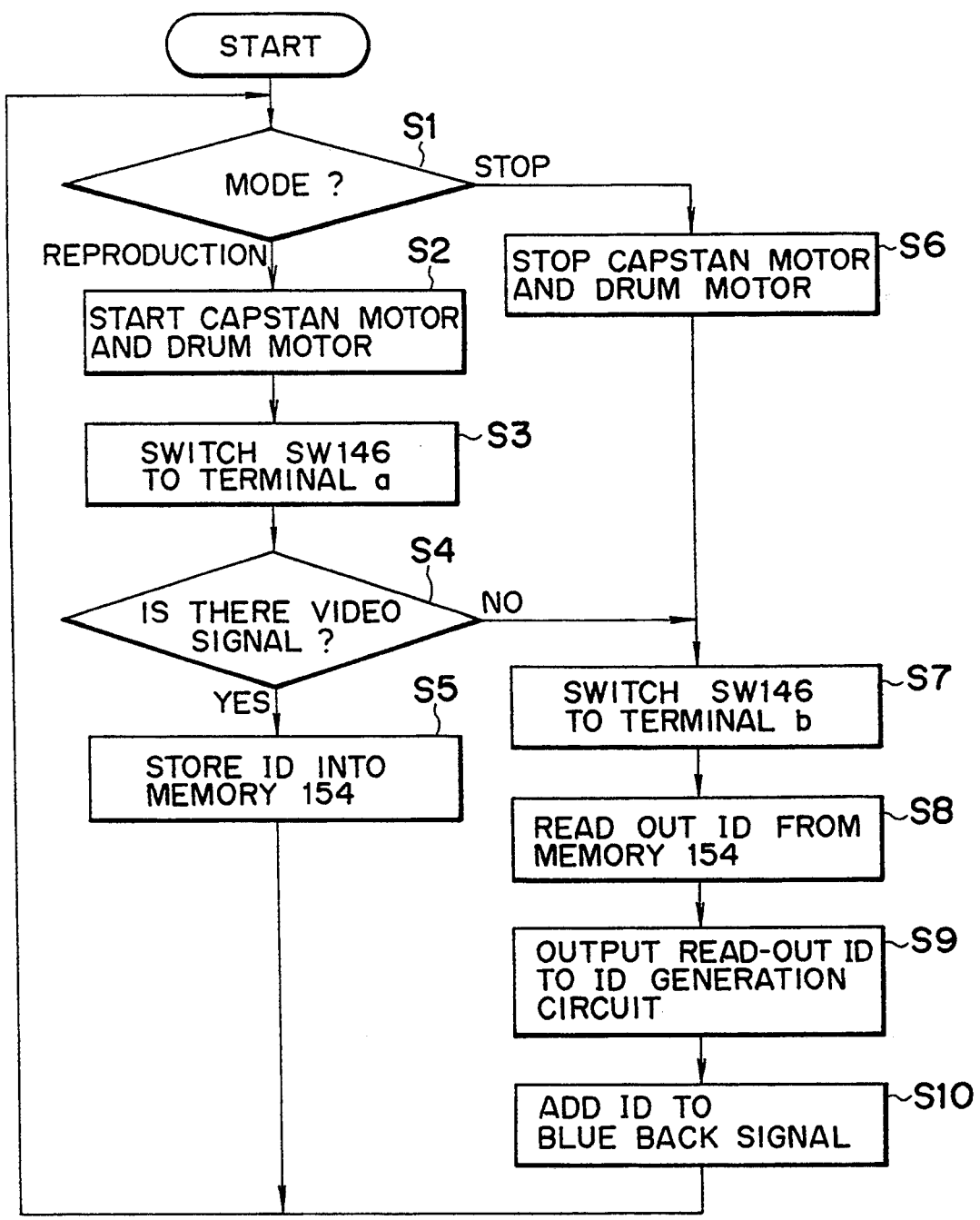
FIG. 18 is a flow chart showing a reproduction operation of the apparatus shown in FIG. 17.

The operation of this embodiment will be described below with reference to the flow chart shown in FIG. 18. When the system control circuit 142 is commanded to start the reproduction mode in accordance with the mode signal from the mode input terminal 144 (S1), it starts the capstan motor 132 and the drum motor 140 (S2), and connects the switch 146 to the contact a (output from the reproduction head 138) (S3). Thus, reproduction of the magnetic tape 134 is started.

The output from the reproduction head 138 is supplied to the system control circuit 142, and is also supplied to the ID detection circuit 150 and the adder 152 via the switch 146. The system control circuit 142 maintains the switch 146 at the contact a when a video signal is present in the output from the reproduction head 138 (S4).

The ID detection circuit 150 detects whether or not digital data shown in FIG. 2 is superposed on an input signal (reproduced video signal). When the circuit 150 detects a 3:4 video signal, it outputs an ID indicating the 3:4 video signal to the system control circuit 142; when the circuit 150 detects a 9:16 video signal, it outputs an ID indicating the 9:16 video signal to the system control circuit 142. The system control circuit 142 stores the ID supplied from the ID detection circuit 150 in the memory 154 to sequentially update the content of the memory 154 (S5).

While a video signal is present in the output from the reproduction head 138, the system control circuit 142 sets the ID generation circuit 156 in an output stop state. Thus, the output (reproduced video signal) from the reproduction head 138 passes through the adder 152, and is supplied to the monitor 158. When the ID signal shown in FIG. 2 is superposed on the input reproduced video signal, the monitor 158 expands an image to 4/3 in the horizontal direction to display an image at the aspect ratio of 9:16; when no ID signal is superposed, the monitor 158 displays an image at the aspect ratio of 3:4.

In this state, assume that a stop mode signal is input from the mode input terminal 144 to the system control circuit 142 (S1). The system control circuit 142 stops the motors 132 and 140 (S6), and switches the switch 146 to the side of the output from the blue back generation circuit 148 (contact b) (S7). The system control circuit 142 also interrupts an updating operation of the memory 154.

The blue back generation circuit 148 generates a blue back signal including a synchronization signal, and its output is supplied to the adder 152 via the switch 146. The system control circuit 142 reads out the ID data stored in the memory 154 immediately before the reproduction operation is stopped (S8), and instructs the ID generation circuit 156 to generate an ID signal according to the readout ID data (S9). More specifically, when the squeeze signal was reproduced and output immediately before the reproduction operation is stopped, the ID generation circuit 156 generates an ID signal indicating a horizontal compression ratio of $\frac{3}{4}$, and supplies it to the adder 152. Of course, when a normal video signal having the aspect ratio of 3:4 was reproduced and output, the ID generation circuit 156 does not perform any operation.

The adder 152 superposes the ID signal from the ID generation circuit 156 on the blue back signal, and supplies its output to the monitor 158 (S10). When the monitor displayed a reproduced image having the aspect ratio of 9:16 immediately before the reproduction operation is stopped, the screen of the monitor 158 is turned to a blue screen having the aspect ratio of 9:16 even after the reproduction operation is stopped.

The system control circuit 142 monitors the output from the reproduction head 138. When no video signal is present in the output from the reproduction head 138 (e.g., when a non-recording region of the magnetic tape 134 is reproduced or when a reproduced signal is omitted) (S4), the system control circuit 142 connects the switch 146 to the contact b, and inhibits the updating operation of the memory 154 (S7). Thereafter, in the same manner as in a case wherein the reproduction operation is stopped (S8 to S10), the monitor 158 displays a blue image at the aspect ratio of 9:16 which is equal to that of an immediately preceding displayed image.

In this embodiment, since a blue screen output in a substantial output stop state maintains the immediately preceding aspect ratio, if a reproduction screen is changed to an output stop screen, the aspect ratio remains constant, and no discomfort is given to a user.

Various changes and modifications of the present invention may be made without departing from the spirit or scope of the invention.

For example, the camera-mounted VTR has been exemplified in the above embodiment. However, the present invention can be applied to any other electronic apparatuses which perform image processing.

In other words, the foregoing description of embodiments has been given for illustrative purposes only and not to be construed as imposing any limitation in every respect.

The scope of the invention is, therefore, to be determined solely by the following claims and not limited by the text of the specifications and alternations made within a scope equivalent to the scope of the claims fall within the true spirit and scope of the invention.

What is claimed is:

1. An image processing apparatus comprising:
   a. input means for inputting a video signal on which aspect ratio information as to an aspect ratio of said video signal is superimposed;
   b. detecting means for detecting the aspect ratio information:
   c. image output means for outputting an image having an aspect ratio corresponding to the aspect ratio detected by said detecting means; and
   d. synthesizing means for synthesizing the output from said image output means with the video signal.

2. An apparatus according to claim 1, wherein said input means includes image pickup means for converting an optical image into an electrical signal.

3. An apparatus according to claim 2, wherein said input means includes conversion means for compressing or expanding images having various aspect ratios into an image having a predetermined aspect ratio.

4. An apparatus according to claim 3, wherein said input means further includes superposing means for superposing conversion information associated with aspect ratio conversion of said conversion means on the video signal output from said input means.

5. An apparatus according to claim 1, wherein an image signal output from said image output means is a title signal.

6. An apparatus according to claim 1, wherein an image signal output from said image output means is a signal associated with image pickup information.

7. An apparatus according to claim 2, further comprising recording means for recording the video signal output from said synthesizing means on a recording medium.

8. An apparatus according to claim 7, further comprising reproduction means for reproducing the video signal recorded by said recording means.

9. An apparatus according to claim 8, wherein said input means alternatively inputs a first video signal obtained by said image pickup means, and a second video signal reproduced from the recording medium by said reproduction means.

10. An apparatus according to claim 1, further comprising recording means for recording the video signal output from said synthesizing means on a recording medium, and reproduction means for reproducing the video signal recorded by said recording means, and said reproduction means including:
 a) read-out means for reading out the recorded video signal from the recording medium;
 b) output detection means for detecting an output state of an output signal output from said read-out means; and
 c) output means for alternatively outputting the video signal output from said read-out means and a predetermined video signal having an aspect ratio corresponding to the signal read out from the recording medium in accordance with an output from said output detection means.

11. An apparatus according to claim 10, wherein said output means detects the aspect ratio of the video signal read out from the recording medium by said detection means.

12. An image processing apparatus comprising:
 a. input means for inputting a first video signal;
 b. reproduction means for reproducing a second video signal from a recording medium;
 c. selecting means for selecting the first video signal or the second video signal; and
 d. detecting means for detecting an aspect of the selected video signal, outputting means for outputting an image having an aspect ratio corresponding to the detected aspect ratio, and synthesizing means for synthesizing the output image with the selected video signal.

13. An apparatus according to claim 12, further comprising recording means for recording the first video signal synthesized by said synthesizing means on the recording medium.

14. An apparatus according to claim 12, wherein said input means includes image pickup means for picking up an object image, generating the first video signal, and conversion means for compressing or expanding images having various aspect ratios into an image having a predetermined aspect ratio.

15. An apparatus according to claim 14, further comprising superposing means for superposing conversion information associated with aspect ratio conversion of said conversion means on the first video signal output from said image pickup means.

16. An apparatus according to claim 15, wherein said synthesizing means detects the conversion information superposed by said superposing means.

17. An image processing apparatus comprising:
 a) read-out means for reading out a video signal recorded on a recording medium;
 b) detection means for detecting an output state of the video signal read out by said read-out means; and
 c) output means for alternatively outputting the video signal output from said read-out means and a predetermined video signal having an aspect ratio corresponding to the video signal read out from the recording medium in accordance with an output from said detection means.

18. An apparatus according to claim 17, wherein the predetermined video signal is a blue back signal.

19. An apparatus according to claim 17, wherein the video signal read out from the recording medium is superposed with aspect ratio information indicating an aspect ratio, and said output means includes aspect ratio detection means for detecting the aspect ratio of the video signal read out from the recording medium on the basis of the aspect ratio information.

20. An apparatus according to claim 17, further comprising recording means for converting video signals having various aspect ratios into a video signal having a predetermined aspect ratio, and recording the converted video signal on the recording medium.

21. An apparatus according to claim 20, wherein said recording medium comprises superposing means for superposing conversion information associated with aspect ratio conversion of the converted video signal having the predetermined aspect ratio, and recording the video signal output from said superposing means on the recording medium.

22. An image processing apparatus comprising:
 a. input means for inputting a video signal on which aspect ratio information as to an aspect ratio of said video signal is superimposed;
 b. detecting means for detecting the aspect ratio information;
 c. image output means for outputting an image in accordance with the aspect ratio detected by said detecting means; and
 d. synthesizing means for synthesizing the output from said image output means with the video signal.

23. An apparatus according to claim 22, wherein said input means includes image pickup means for picking up an object image and generating the video signal.

24. An apparatus according to claim 23, wherein said input means includes conversion means for compressing or expanding images having various aspect ratios into an image having a predetermined aspect ratio.

25. An apparatus according to claim 24, wherein said input means further includes superposing means for superposing conversion information associated with aspect ratio conversion of said conversion means on the first video signal output from said image pickup means.

26. An apparatus according to claim 22, wherein said input means includes reproduction means for reproducing the video signal from a recording medium.

27. An apparatus according to claim 22, further comprising recording means for recording the video signal output from said synthesizing means on a recording medium.

28. An apparatus according to claim 27, further comprising reproduction means for reproducing the video signal recorded by said recording means.

29. An image processing apparatus comprising:
   a. reproduction means for reproducing a video signal from a recording medium;
   b. detecting means for detecting an aspect ratio of the video signal reproduced by reproduction means;
   c. image output means for outputting an image in accordance with the aspect ratio detected by said detecting means; and
   d. synthesizing means for synthesizing the output from said image output means with the video signal.

30. An apparatus according to claim 29, wherein the video signal reproduced by said reproduction means is superposed with aspect milo information indicating an aspect ratio.

31. An apparatus according to claim 29, further comprising recording means for recording a video signal and aspect ratio information indicating an aspect ratio of the video signal on the recording medium.

32. An apparatus according to claim 31, wherein said recording means superimposes said aspect ratio information on said video signal to record the superimposed video signal on said recording medium.

33. An image processing apparatus comprising:
   a. input means for inputting a first video signal;
   b. reproduction means for reproducing a second video signal from a recording medium;
   c. selecting means for selecting the first video signal or the second video signal; and
   d. detecting means for detecting an aspect ratio of the selected video signal, outputting means for outputting an image in accordance with tile detected aspect ratio, and synthesizing means for synthesizing the output image with the selected video signal.

34. An apparatus according to claim 33, wherein said input means includes image pickup means for picking up an object image and generating the first video signal.

* * * * *